United States Patent [19]
Burrowes

[11] 4,358,788
[45] Nov. 9, 1982

[54] LEGIBILITY FOR ALPHA-MOSAIC CHARACTERS

[75] Inventor: Sherwin D. Burrowes, East Windsor, N.J.

[73] Assignee: RCA Corporation, New York, N.Y.

[21] Appl. No.: 238,838

[22] Filed: Feb. 27, 1981

[51] Int. Cl.³ ............... H04N 9/535; H04N 5/14; G09G 1/16; G09G 1/28
[52] U.S. Cl. .................. 358/22; 358/37; 358/39; 358/147; 340/701; 340/748; 340/723; 340/793
[58] Field of Search ............. 358/22, 37, 39, 96, 358/147, 166, 160; 340/701, 703, 704, 723, 728, 742, 744, 748, 750, 812

[56] References Cited

U.S. PATENT DOCUMENTS 4,212,008 7/1980 Hopkins .................. 340/793
4,314,245 2/1982 Wilbur ..................... 340/744

*Primary Examiner*—John C. Martin
*Attorney, Agent, or Firm*—Eugene M. Whitacre; William H. Meise; Henry I. Steckler

[57] ABSTRACT

In add-on alpha-mosaic character (teletext) decoders, the character signals pass through the limited bandwidth chroma channel of the TV receiver. For certain color combinations and signal durations this reduces legibility and contrast due to pulse stretching and amplitude reduction. The present invention determines if a pulse is less than a predetermined pulse width and has an amplitude difference with respect to a preceding pulse of less than a selected amount. If both conditions are met, then a luminance signal pulse is generated to substitute for the original pulse, the generated pulse having a large amplitude difference with respect to the preceding pulse for improved contrast. If the generated pulse would exceed the white level or go below the black level, then a pulse of opposite polarity with respect to the first generated pulse is generated to cancel the first generated pulse but still result in a large amplitude difference with respect to the preceding pulse.

14 Claims, 5 Drawing Figures

LEGIBILITY FOR ALPHA-MOSAIC CHARACTERS

BACKGROUND OF THE INVENTION

The present invention relates to alpha-mosaic ("Teletext"/"Viewdata", etc.) decoders, and more particularly to such decoders that are added on ("set-top") to television receivers.

It is known to transmit pulse signals representing alpha-mosaic characters using eight grey scale levels during the vertical blanking interval of a television signal. Recently, interest has expanded to include the use of color characters. Ideally, a decoder for such characters is built into the television receiver during manufacture. In such case, the decoder provides red (R), green (G), and blue (B) pulse signals directly to the video display circuits in the receiver, thus bypassing the limited-bandwidth chroma channel therein. This allows the display of broad bandwidth (high resolution) characters.

However, there are many receivers in use that do not have built-in decoders. For such receivers, if it is desired to receive and display said characters, an external ("set-top") decoder is required. Set-top decoders apply R, G, and B signals representing the characters to a modulator that modulates an R.F. generator, which generator is set to a frequency corresponding to a locally unused television channel. The modulated R.F. signal is applied to the antenna terminals of the receiver, and in the receiver the signal is demodulated, applied to the luminance and chrominance channels, and then applied to the display circuitry. Thus, the pulse character signals are stretched and have their amplitude reduced by the limited-bandwidth receiver chroma channel. However, the bandwidth of the luminance channel is normally sufficient to pass the signals without appreciable pulse stretching or amplitude reduction.

The legibility and contrast of a character depends inter alia upon the ratio of the amplitude of its color signal to the amplitude of the color signal of the surrounding background. For certain combinations, e.g., yellow character against a white background or blue character against a black background, the legibility is reduced. In the first case, the yellow signal is transmitted through the chroma channel, which reduces its relative amplitude (in IRE units), while the white signal is primarily transmitted through the luminance channel, which does not appreciably reduce its relative amplitude (100 IRE units). The relative amplitude of the yellow signal may be so far reduced with respect to the white signal relative amplitude that it cannot be seen against the white background. The same relative amplitude reduction happens to the blue signal with respect to the relative amplitude of the black signal (0 IRE units), and therefore the blue signal is difficult to see against the black background. In general, the most difficult legibility problem occurs when there is a difference of one grey scale level between a character and its background.

It is therefore an object of the present invention to improve the legibility and contrast of alpha-mosaic characters, and more particularly to achieve such with set-top decoders.

SUMMARY OF THE INVENTION

Method and apparatus for increasing the contrast of a quantized pulsatory video signal, comprising determining if the width of pulses within said video signal is less than a predetermined duration, and modifying said video signal to increase the absolute value of the difference of a level of said video signal with respect to the preceeding signal level of the modified signal when said pulse width is less than said predetermined duration and if said absolute value is less than a selected amount.

DETAILED DESCRIPTION OF THE INVENTION

Figure 1:
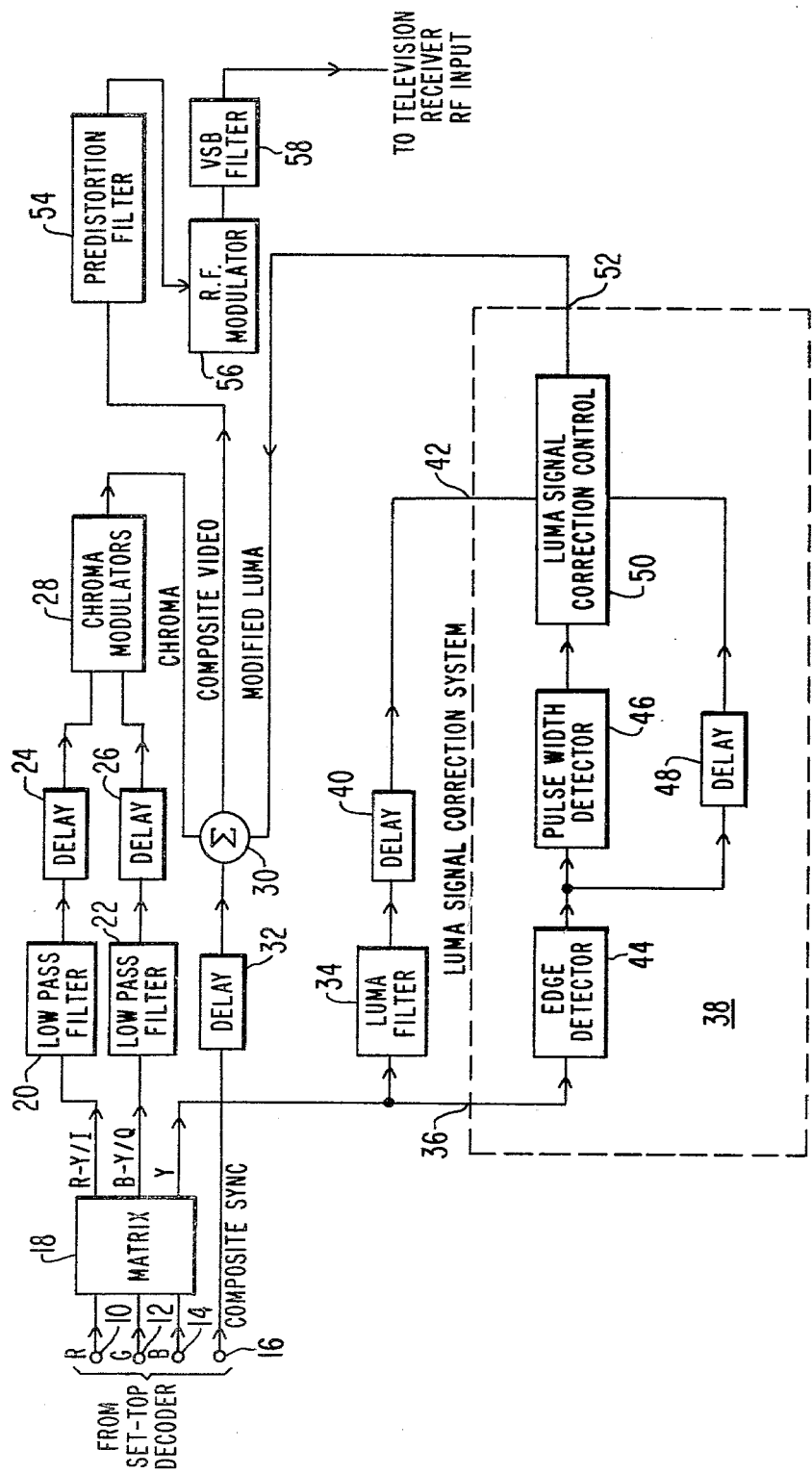
FIG. 1 is a block diagram of a system incorporating the invention.

FIG. 1 shows a block diagram of a system incorporating the invention. Input terminals 10, 12, 14 and 16 respectively receive R (red), G (green), B (blue) color component signals, and composite sync signals from a set-top decoder (not shown). The R, G, and B signals are matrixed by matrix 18 to provide R-Y, B-Y, and Y (luminance) signals. In teletext, the Y signal is quantized using eight grey scale levels (the luminance components of three primary colors, 3 secondary colors and black and white). Alternatively, I (in phase) and Q (quadrature) signals can be produced by matrix 18 instead of the R-Y and B-Y signals respectively. The R-Y and B-Y signals are respectively applied to LPFs (low-pass filters) 20 and 22, which have 1.5 and 0.5 MHz cutoff frequencies respectively, and then to delay lines 24 and 26 (explained below) respectively. Finally, the signals are applied to chroma modulators 28, which provides a 3.58 MHz signal modulated by the R-Y and B-Y signals in phase quadrature. The modulated signal is then applied to adder 30. The composite sync signal at input 16 is applied to delay line 32 (explained below) and then to adder 30. The Y signal from matrix 18 is applied to LPF 34 having a 4.2 MHz cutoff frequency and to input 36 of the LSCS (luminance signal correction system) 38. The output of LPF 34 is applied to delay line 40 (explained below) and then to input 42 of LSCS 38. LSCS 38 comprises an edge detector 44 for detecting pulse edges in the Y signal applied to input 36.

A pulse width detector 46 detects when pulses have widths of less than about 1 μs (microsecond), which is about the duration of pulses that are difficult to reproduce by chroma circuits due to pulse spreading and amplitude reduction. Since it takes about 1 μs to detect if pulses have this duration or less, delay line 48 has about 1 μs delay. Thus, the signals from detectors 44 and 46 will be in synchronization when applied to LSCC (luminance signal correction control circuit) 50. Circuit 50 appropriately modifies (explained below) the luminance signal of a character of less than about 1 μs duration when received at input 42 to increase its contrast with respect to the surrounding background, and applies the thus modified signal to output 52 connected to adder 30. In doing this, a certain delay is inherent in circuit 50 due to switching transients therein, which delay depends upon the speed of the circuitry used in circuit 50. Adder 30 provides a composite video output signal.

It will be appreciated that for proper registration and synchronization to occur when the composite video signal from adder 30 is displayed, the input signals thereof must be properly timed. The delay in LSCS 38 is about 1 μs plus said switching transients. All LPFs introduce some delay, which is inversely proportional to their cutoff frequency. Therefore, the delay of delay lines 24 and 26 is set equal to 1 μs plus said switching transients minus the delay introduced by LPFs 20 and 22 respectively. The delay of delay line 40 is set equal to about 1 μs minus the delay of LPF 34 since its output is applied to LSCC 50, and therefore, switching delays are not yet encountered.

The composite video signal from adder 30 is applied to predistortion or "Fredendall" filter 54 to compensate for the delay introduced by the audio trap of the television set as required and specified by the FCC. The signal from filter 54 is applied to RF modulator 56 that generates an RF signal on a locally unused channel, which RF signal is modulated by the signal from filter 54. The modulated RF signal is applied to VSB (vestigial sideband filter) 58 in accordance with FCC specifications. The output of VSB 58 is applied to the antenna terminals of the television receiver, which is tuned to said locally unused channel.

Figure 2:
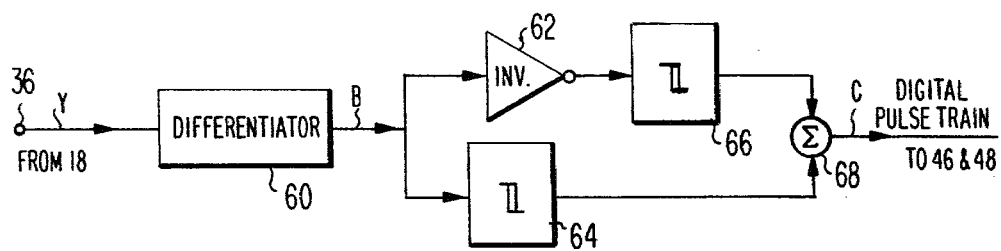
FIG. 2 is a block diagram of an edge detector used in FIG. 1.
Figure 5:
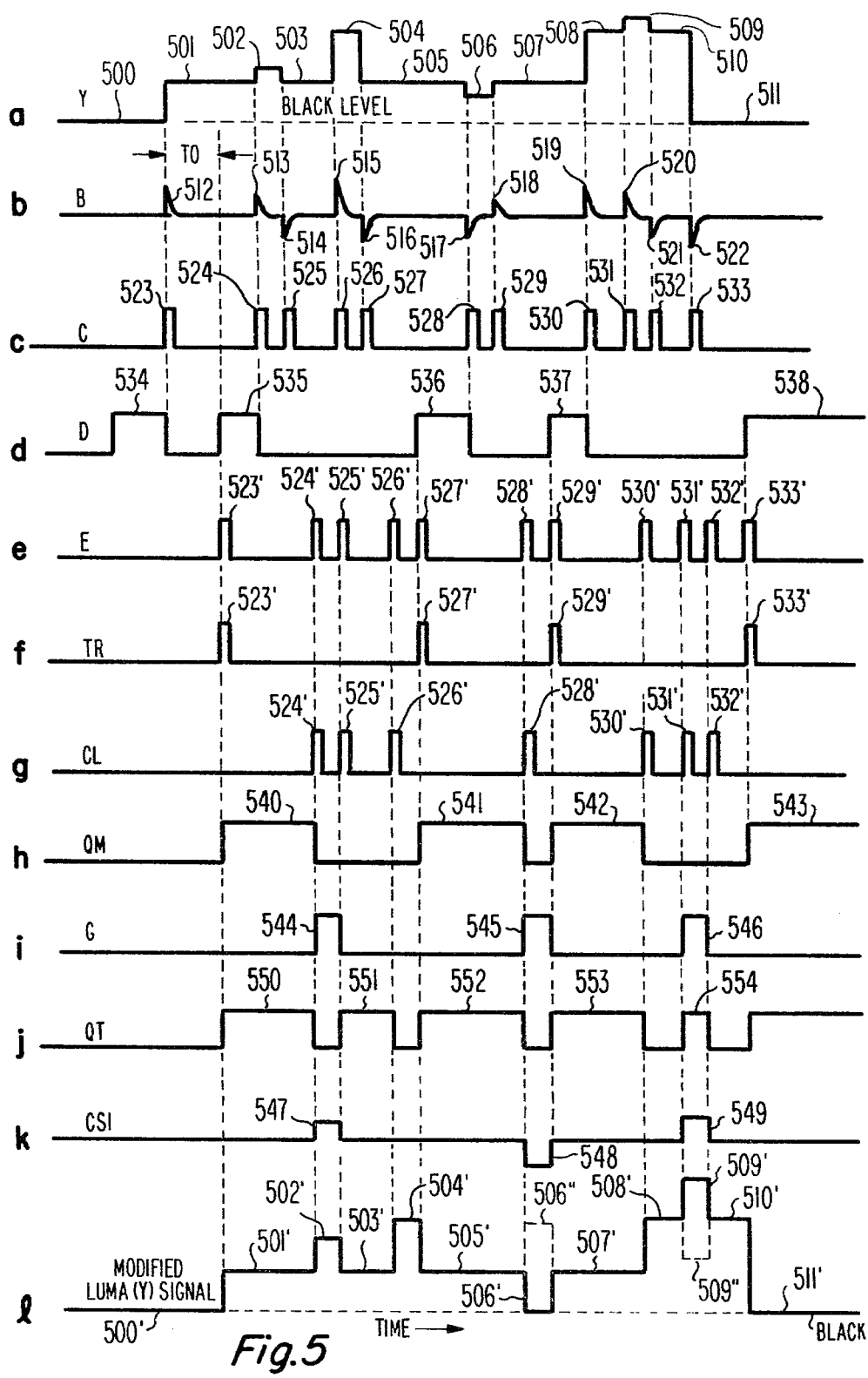
FIG. 5 is a timing diagram useful in explaining FIGS. 2, 3 and 4.

FIG. 2 shows a block diagram of edge detector 44. An illustrative Y signal that is received from matrix 18 is shown in FIG. 5a. Pulses 501–510 are present in the Y signal. First and last voltage levels 500 and 511 are at black level, while the pulses 501–510 are at various grey levels and represent either characters or backgrounds. Time duration $T_0$ (in this embodiment 1 μs) is shown for scale and represents the duration of a pulse below which the Y signal is to be modified. The Y signal is applied to R-C differentiator 60 that generates the waveform B having impulses 512–522 (shown in FIG. 5b) that occur at the leading and trailing edges of pulses 501–510. The waveform B is applied to inverter 62 as well as to Schmitt trigger 64. The output signal from inverter 62 is applied to a second Schmitt trigger 66. Triggers 64 and 66 provide output pulses whenever their respective input signals exceed a small positive threshold, and their output signals are summed by adder 68 to form at its output waveform C as shown in FIG. 5c. Thus, pulses 523, 524, 526, 529, 530 and 531 are provided by trigger 64 upon actuation by positive-going impulses 512, 513, 515, 518, 519 and 520, respectively, while pulses 525, 527, 528, 532 and 533 are provided by trigger 66 upon actuation by the negative-going pulses 514, 516, 517, 521 and 522, respectively, due to their inversion by inverter 62. The waveform C from adder 68 is applied to delay line pulse width detector 46 and delay line 48.

Figure 3:
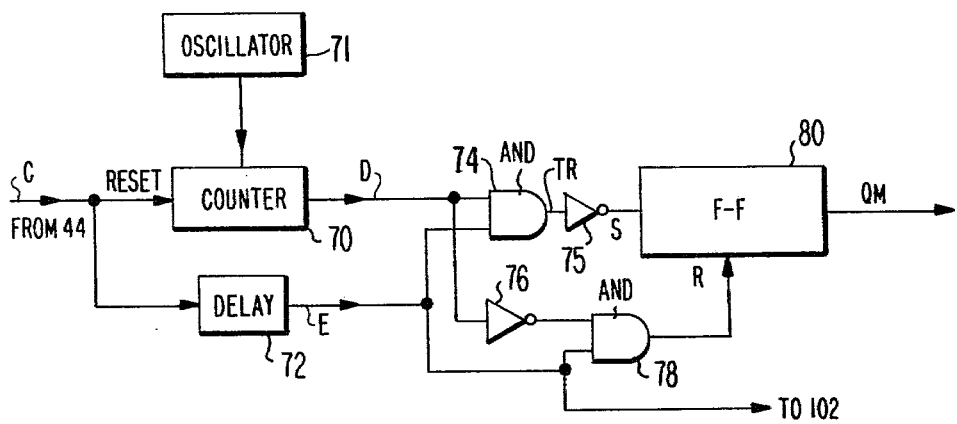
FIG. 3 is a block diagram of a pulse width detector used in FIG. 1.

FIG. 3 shows a block diagram of a pulse width detector 46. The waveform C from edge detector 44 is applied to the reset input of counter 70 and to delay line 72, which has a delay of $T_0$ (about 1 μs). Counter 70 receives pulses from oscillator 71 having a frequency of about 20 to 30 MHz. Counter 70 counts pulses from oscillator 71 and provides an output pulse (shown in waveform D in FIG. 5d) after a selected number of pulses have been counted, unless counter 70 is reset by the pulses in waveform C before said selected number has been reached. Said selected number is determined in accordance with the frequency of oscillator 71 so that it will be reached when the interval between pulses in waveform C equals or exceeds $T_0$. Thus, in waveform D, pulse 534 occurs since signal C is initially low for a time greater than $T_0$. The trailing edge of pulse 534 is determined by pulse 523 which resets counter 70. Further, since the interval between pulses 523 and 524 is greater than $T_0$, pulse 535 occurs. Its leading edge occurs at a time $T_0$ after the trailing edge of reset pulse 523, while its trailing edge is determined by pulse 524. The intervals between pulses 524, 525, 526 and 527 are all less than $T_0$, so no pulse occurs in this interval in waveform D. Similarly, pulses 536, 537 and 538 occur in waveform D at a time duration of $T_0$, after pulses 527, 529 and 533, respectively, since no reset pulses have occurred within $T_0$ in the respective intervals. The delay line 72 delays the pulses in waveform C by $T_0$ to produce waveform E as shown in FIG. 5e with corresponding pulses given corresponding reference numerals with primes added. The waveforms D and E are applied to respective inputs of AND gate 74 to produce the waveform TR of FIG. 5f. Thus, only those pulses of waveform E that occur when D is high, which indicates the start of pulses in the delayed and modified waveform Y in FIG. 5(l) (explained below) having greater duration than $T_0$, are passed by gate 74 to inverter 75 to the set (S) input of flip-flop (bi-stable multivibrator) 80. Waveform D is inverted by inverter 76 and then applied together with waveform E to respective inputs of AND gate 78. Therefore, only those pulses of waveform E that occur when waveform D is low are passed by gate 78, e.g., 524', 525', 526', 528', 530', 531', and 532'. This waveform is called "CL" (FIG. 5g) and the first pulses therein occurring after a pulse in waveform TR, e.g., 524', 528', and 530', indicate the end of pulses in the delayed Y signal of FIG. 5(l) that are greater than $T_0$ and the start of pulses in the delayed Y signal of less than $T_0$. Waveform CL is applied to a reset (R) input of flip-flop 80. The output signal of flip-flop 80 is derived from its Q output and is the waveform QM of FIG. 5h. Pulses 523' and 524' cause flip-flop 80 to set and reset respectively, thereby generating pulse 540. Reset pulses 525' and 526' have no effect since flip-flop 80 is already reset. Similarly, pulses 527' and 528' define pulse 541; pulses 529' and 530' define pulse 542; and pulse 533' starts pulse 543, etc. Again note that reset pulses 531' and 532' have no effect on flip-flop 80. Therefore the positive and negative going transitions of waveform QM indicate the start of an interval in the delayed Y signal having only pulses of greater and less than $T_0$ duration respectively. In other words, when QM is high or low, the interval has only pulses greater or less than $T_0$, respectively.

Figure 4:
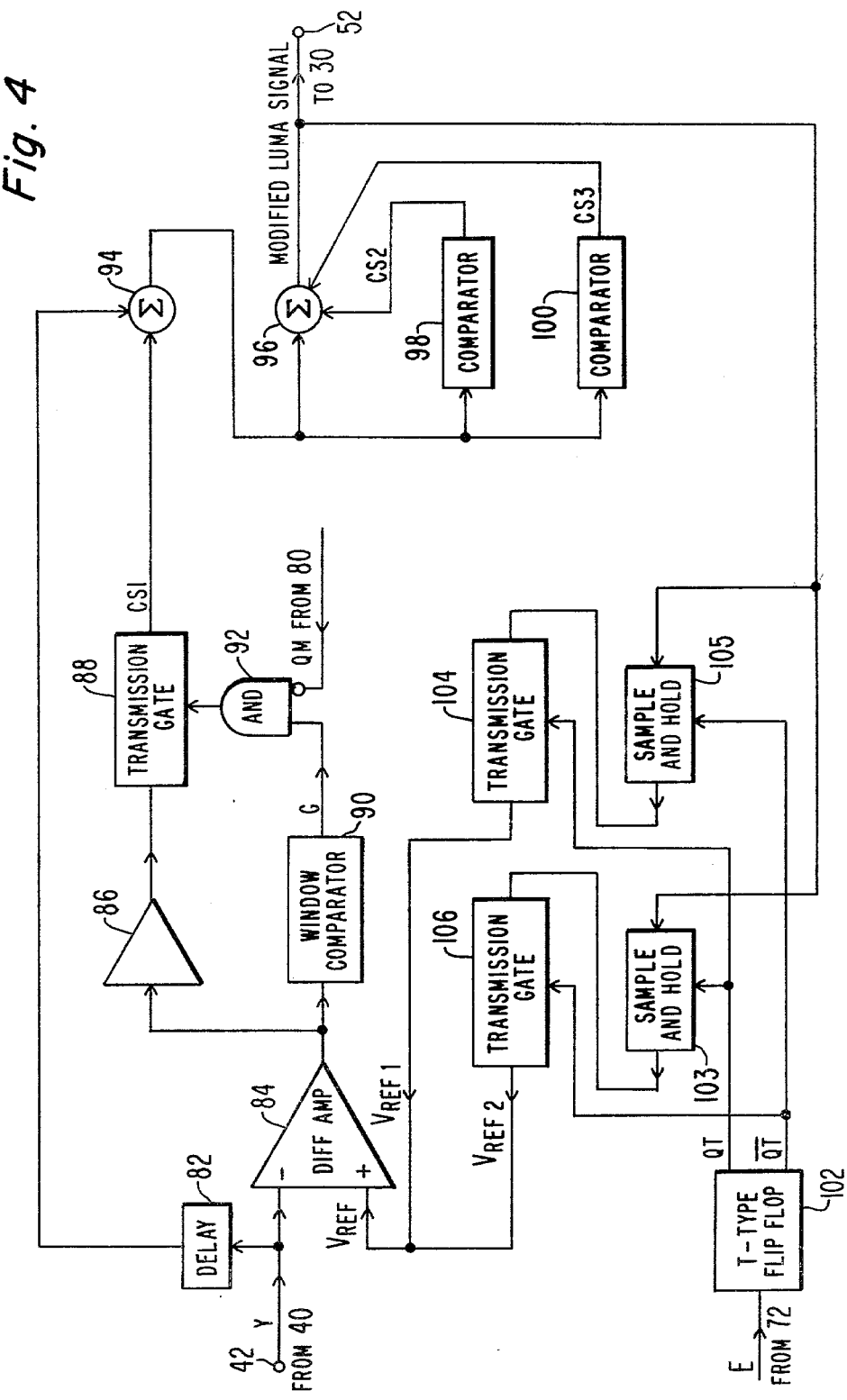
FIG. 4 is a block diagram of a luminance signal correction control circuit used in FIG. 1.

FIG. 4 shows a block diagram of LSCC circuit 50. The Y signal from delay line 40 at input 42 is applied to delay line 82 and to the inverting input of differential amplifier 84. The non-inverting input of amplifier 84 receives a signal that represents the previous level of the modified Y signal of FIG. 5(l) as compared with the present reference level of the Y signal at the inverting input. A signal representing the difference between these signals is present at the output of amplifier 84, and it is applied to amplifier 86 and then to gate 88. Said difference signal is also applied to window comparator 90, which comparator provides an output signal G (FIG. 5i) which is high (pulses 544, 545, and 546) when the absolute value of the difference signal is less than a selected amount. Signal G is applied to one input of AND gate 92. The QM signal from flip-flop 80 is applied to the inverting input of gate 92. Thus, the output signal from gate 92 will be high when signal G is high (small difference signal) and when signal QM is low (pulses less than $T_0$), and it is applied to open (let the signal from amplifier 86 pass through) gate 88 when high.

The output signal from gate 88 is called CS1 (FIG. 5k) and has pulses 547, 548, and 549 therein, which pulses coincide with pulses 544, 545, and 546 respectively of signal G. However, note that the polarities can be opposite, e.g., 545 and 548, depending upon the polarity of the difference signal from amplifier 84. Signal CS1 is applied to adder 94, along with the signal from delay line 82, which has a delay to compensate for switching delays in gate 88. If high-speed logic is used for gate 88, then delay line 82 can be eliminated and a direct connection made between input 42 and adder 94.

The output signal from adder 94 thus comprises the Y signal at input 42 plus the amplified difference signal CS1, which signal CS1 has the effect of exaggerating the amplitude difference between pulses of less than $T_0$ duration and the background when those differences are within the window of comparator 90. The result is the modified luminance signal of FIG. 5(l), where pulses corresponding to those shown in FIG. 5a have corresponding reference numerals with primes added to denote the time delay of $T_0$. Note that short pulses 502', 506' and 509' have a greater amplitude difference with respect to their background reference level, pulses 501' and 503', 505' and 507', and 508' and 510', respectively, than do the corresponding pulses in FIG. 5a, thereby improving their legibility when displayed.

In order to obtain the reference level signal for the non-inverting output of amplifier 84, the signal E from delay line 72 of FIG. 3 is applied to the input of T-type flip-flop 102 of FIG. 4. The output signal from the Q output of flip-flop 102 is called "QT" and is shown in FIG. 5j. At every transition of the Y signal, flip-flop 102 changes state, thus pulses 523' and 524' in FIG. 5e define leading and trailing edges of pulse 550, pulses 525' and 526' define pulse 551, pulses 527' and 528' define pulse 552, etc.

When the QT signal is high, such as during pulse 551, sample-and-hold circuit 103 samples the modified luminance signal at output 30 (pulse 503' in FIG. 5(l) and gate 104 allows the signal then stored in sample-and-hold circuit 105 (pulse 502') to be applied to the non-inverting input of amplifier 84 as a reference level signal. During this time, the $\overline{QT}$ signal from the $\overline{Q}$ output of flip-flop 102 is low, and thus gate 105 is not sampling the signal at output 30, while gate 106 is closed, not allowing sample-and-hold circuit 103 to provide the signal presently being sampled. At the next transition signal, signal QT becomes low and signal $\overline{QT}$ is high, and thus circuit 103 provides the previous level 503' to gate 106, which gate 106 allows the stored signal 503' to be applied to the non-inverting input of amplifier 84 as a reference signal. Further, circuit 105 is enabled to sample the signal at output 30 (504') and gate 104 does not allow the output of sample-and-hold circuit 105 to be applied to amplifier 84, at pulse 552 the first of the above-described states reoccurs. The states of the gates and sample-and-hold circuits therefore alternate, and thus the previous level in the modified luminance signal of FIG. 5(l) is supplied as a reference signal to amplifier 84.

With the system described so far, a problem can arise. Consider in FIG. 5(l) if pulses 505' to 507' are closer to black level than actually shown, e.g., a black character against a blue background. The pulse 506' will be driven into the blacker-than-black region by the above-described circuitry. However, such a pulse cannot be accurately reproduced by the television receiver due to possible black level clippers or the fact that the display tube electron beam cannot be cut off to less than zero. Further, consider if pulses 508'–510' are closer to white level than shown, e.g., a white character against a yellow background, then pulse 509' will be driven into the whiter-than-white region. This also cannot be accurately reproduced due to possible white level clippers or due to the fact that the displayed picture will bloom if the electron beam is increased too much, thus destroying the legibility of the character.

To overcome this problem, the output signal from adder 94 is applied to the inputs of adder 96 and to comparators 98 and 100. Comparator 98 detects when the output signal from adder 94 goes blacker-than-black and provides a large positive pulse signal CS2 (not shown) that is applied to adder 96. The amplitude of this pulse is sufficient to overcome both the original negative-going (FIG. 5a) pulse 506 and negative-going pulse 548 of signal CS1 (FIG. 5k) to result in a positive-going pulse 506" in FIG. 5(l). Note the large amplitude difference between pulse 506" and pulses 505' and 507' for good legibility. Similarly, comparator 100 detects when the signal from adder 94 is whiter-than-white and provides a large negative-going pulse CS3 (not shown) sufficient in amplitude to overcome both original positive-going pulse 509 and positive-going pulse 549 in CS1 resulting in pulse 509". There is a large amplitude difference between pulse 509" and pulses 508' and 510' for good legibility. The output of adder 96 comprises the output 52 of LSCC circuit 38.

What is claimed is:

1. A method for increasing the contrast of a quantized pulsatory video signal, said method comprising determining if the width of a pulse within said video signal is less than a predetermined duration, and modifying said video signal to increase the absolute value of the difference of a level of said video signal with respect to the preceding signal level of the modified signal when said pulse width is less than said predetermined duration and if said absolute value is less than a selected amount.

2. A method as claimed in claim 1, wherein said determining step comprises generating signals indicative of edges in said quantized pulsatory video signal, counting pulses between said edge signals and providing an output signal when said count corresponds to said predetermined duration, delaying by said predetermined duration said edge signals, setting a circuit to a first state upon the occurrence of said delayed edge signals and said output signal, and resetting said circuit upon the occurrence of the inverse of said output signal and said delayed edge signals.

3. A method as claimed in claim 2, wherein said generating step comprises differentiating said quantized video signal, triggering a pair of trigger circuits in accordance with the differentiated signal and the inverse thereof respectively, and adding the outputs of said trigger circuits.

4. A method as claimed in claim 1, wherein said modifying step comprises comparing said quantized video signal level to said preceding modified signal level, determining if the absolute value of the difference between said levels is less than said selected amount, and adding an amplified difference signal to said quantized video signal if the pulse width is less than said selected duration and said absolute value is less than said selected amount.

5. A method as claimed in claim 4, further comprising determining if the modified video signal would cross at least one selected threshold, and adding a pulse of opposite polarity of said amplified difference signal to said video signal to increase said absolute value without crossing said threshold if such threshold would have been crossed by said modified video signal.

6. A method as claimed in claim 1, wherein said quantized video signal comprises a luminance signal representing alpha-mosaic characters.

7. An apparatus for increasing the contrast of a quantized pulsatory video signal, said apparatus comprising means for determining if the width of a pulse within said video signal is less than a predetermined duration, and means for modifying said video signal to increase the absolute value of the difference of a level of said video signal with respect to the preceding signal level of the modified signal when said pulse width is less than said predetermined duration and if said absolute value is less than a selected amount.

8. An apparatus as claimed in claim 7, wherein said determining means comprises means for generating signals indicative of edges in said quantized pulsatory video signal, a pulse oscillator, means for counting pulses from said oscillator and between said edge signals and for providing an output signal when the count corresponds to said predetermined duration, means for delaying by said predetermined duration said edge signals, a bi-stable circuit, means for setting said bi-stable circuit to a first state upon the occurrence of the delayed edge signals and said output signal, and means for resetting said circuit upon the occurrence of the inverse of said output signal and said delayed edge signals.

9. An apparatus as claimed in claim 8, wherein said generating means comprises means for differentiating said quantized video signal, a pair of trigger circuits triggered in accordance with the differentiated signal and the inverse thereof respectively, and means for adding the outputs of said trigger circuits.

10. An apparatus as claimed in claim 7, wherein said modifying means comprises means for comparing said quantized video signal level to said preceding modified signal level and for providing a difference signal in accordance therewith, window comparator means for determining if the absolute value of the difference between said levels is less than said selected amount, means for amplifying said difference signal, and means for adding the amplified difference signal to said quantized video signal if the pulse width is less than said selected duration and said absolute value is less than said selected amount.

11. An apparatus as claimed in claim 10, wherein said comparing means comprises first and second sample-and-hold circuits coupled to receive said modified video signals; first and second gates coupled to the outputs of said first and second sample-and-hold circuits respectively; a differential amplifier having a first input coupled to receive said quantized video signal; a second input coupled to the outputs of said gates, and an output coupled to said window comparator and said amplifying means; and means for alternately enabling said first gate for transmission and said second sample-and-hold circuit for sampling and then enabling said second gate for transmission and said first sample-and-hold circuit for sampling.

12. An apparatus as claimed in claim 10, further comprising first and second comparator means for determining if the modified video signal would exceed or go below the first and second selected thresholds respectively and for adding a pulse of opposite polarity of said amplified difference signal to said video signal to increase said absolute value without exceeding or going below said thresholds respectively if said thresholds would have been exceeded or gone below said modified video signal.

13. An apparatus as claimed in claim 12, wherein said first and second thresholds comprise peak white and black levels respectively.

14. An apparatus as claimed in claim 7, wherein said quantized video signal comprises a luminance signal representing alpha-mosaic characters.

* * * * *